(12) United States Patent
Gong et al.

(10) Patent No.: US 7,261,097 B2
(45) Date of Patent: Aug. 28, 2007

(54) EGR SYSTEM FOR SPARK-IGNITED GASOLINE ENGINE

(75) Inventors: Weidong Gong, Dunlap, IL (US); Martin L. Willi, Dunlap, IL (US); Scott B. Fiveland, East Norwich, NY (US); Brett M. Bailey, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/169,674

(22) Filed: Jun. 30, 2005

(65) Prior Publication Data

US 2007/0000472 A1    Jan. 4, 2007

(51) Int. Cl.
*F02B 47/08*  (2006.01)
*F02B 19/00*  (2006.01)
*F02M 25/07*  (2006.01)

(52) U.S. Cl. .......................... 123/568.21; 123/568.12; 60/605.2

(58) Field of Classification Search ........... 123/568.21, 123/568.11, 559.1; 701/108; 60/605.2
See application file for complete search history.

(56) References Cited

U.S. PATENT DOCUMENTS

| | | | |
|---|---|---|---|
| 4,864,989 A | 9/1989 | Markley | |
| 5,947,076 A | 9/1999 | Srinivasan et al. | |
| 6,079,382 A * | 6/2000 | Schafer et al. | 123/90.17 |
| 6,237,336 B1 | 5/2001 | Feucht et al. | |
| 6,951,211 B2 * | 10/2005 | Bryant | 123/559.1 |
| 7,013,879 B2 * | 3/2006 | Brookshire et al. | 123/568.12 |

* cited by examiner

Primary Examiner—Stephen K. Cronin
Assistant Examiner—Johnny H. Hoang
(74) Attorney, Agent, or Firm—Finnegan, Henderson, Farabow, Garrett & Dunner

(57) ABSTRACT

An internal combustion engine has at least one combustion chamber and a piston configured to reciprocate within the at least one combustion chamber between a top-dead-center position and a bottom-dead-center position. The internal combustion engine also has a pre-combustion chamber, an air induction system, a fuel system, a spark plug at least partially disposed within the pre-combustion chamber. The air induction system is configured to direct air into the at least one combustion chamber. The fuel system is configured to direct gasoline into the at least one combustion chamber. The spark plug is configured to selectively ignite a mixture of the air and gasoline. The internal combustion engine also has an exhaust system configured to direct exhaust from the at least one combustion chamber and an exhaust gas recirculation system configured to selectively redirect at least a portion of the exhaust from the exhaust system back to the air induction system.

18 Claims, 2 Drawing Sheets

EGR SYSTEM FOR SPARK-IGNITED GASOLINE ENGINE

TECHNICAL FIELD

The present disclosure relates generally to an exhaust gas recirculation system (EGR) and, more particularly, to an exhaust gas recirculation system for a spark-ignited (SI) gasoline engine.

BACKGROUND

Internal combustion engines such as gasoline engines exhaust a complex mixture of air pollutants. The air pollutants are composed of solid particulate matter and gaseous compounds including nitrous oxides (NOx). Due to increased attention on the environment, exhaust emission standards have become more stringent and the amount of solid particulate matter and gaseous compounds emitted to the atmosphere from an engine is regulated depending on the type of engine, size of engine, and/or class of engine.

One method that has been implemented by engine manufacturers to comply with the regulation of these engine emissions has been to implement exhaust gas recirculation (EGR). EGR systems recirculate the exhaust gas by-products into the intake air supply of the internal combustion engine. The exhaust gas, which is redirected to a cylinder of the engine, reduces the concentration of oxygen therein, thereby lowering the maximum combustion temperature within the cylinder. The lowered maximum combustion temperature slows the chemical reaction of the combustion process, thereby decreasing the formation of nitrous oxides. In addition, the particulate matter entrained in the exhaust is burned upon reintroduction into the engine cylinder to further reduce the exhaust gas by-products. One such EGR system is disclosed in U.S. Pat. No. 6,237,336 (the '336 patent), issued to Feucht et al. on May 29, 2001.

The '336 patent discloses a spark-ignited gasoline engine having a plurality of pistons reciprocatingly disposed within combustion chambers of the engine. Exhaust gases, which are discharged from the combustion chambers, flow through an exhaust manifold to a turbine. The turbine drives a compressor to force a portion of the exhaust gases and air through an air-to-air aftercooler (ATAAC) back into the combustion chambers for subsequent combustion.

Although the EGR system of the '336 patent may reduce the amount of NOx and particulate matter exhausted to the atmosphere, it may be limited. In particular, as the amount of exhaust gas recirculated back into the combustion chambers of the engine increases, the air-to-fuel ratio of the engine likewise increases. Eventually, the air-to-fuel ratio will reach a lean burn condition that can no longer can support normal spark ignition. When spark ignition of the air/exhaust gas/fuel mixture fails, operation of the engine can become unstable and/or unpredictable. In addition, if the amount of exhaust gas recirculated back into the engine is limited to a predetermined air-to-fuel ratio that provides for spark ignition, the amount of NOx and particulate matter removed from the exhaust flow may be insufficient to comply with emission regulations.

The disclosed EGR system is directed to overcoming one or more of the problems set forth above.

SUMMARY OF THE INVENTION

In one aspect, the present disclosure is directed to an internal combustion engine including at least one combustion chamber and a piston slidably disposed within the at least one combustion chamber. The piston is configured to reciprocate between a top-dead-center position and a bottom-dead-center position. The internal combustion engine also includes a pre-combustion chamber in communication with the at least one combustion chamber. The internal combustion engine further includes an air induction system, a fuel system, and a spark plug at least partially disposed within the pre-combustion chamber. The air induction system is configured to direct air into the at least one combustion chamber. The fuel system is configured to direct gasoline into the at least one combustion chamber. The spark plug is configured to selectively ignite a mixture of the air and gasoline. The internal combustion engine also has an exhaust system configured to direct exhaust from the at least one combustion chamber, and an exhaust gas recirculation system configured to selectively redirect at least a portion of the exhaust from the exhaust system back to the air induction system In another aspect, the present disclosure is directed to a method of operating an internal combustion engine. The method includes directing a gasoline/air mixture to at least one combustion chamber and directing a gasoline/air mixture to a pre-combustion chamber in fluid communication with the at least one combustion chamber. The method also includes compressing the gasoline/air mixture in the at least one combustion chamber and the pre-combustion chamber, and igniting the compressed gasoline/air mixture to produce a power output and exhaust. The method further includes redirecting at least a portion of the exhaust back into the at least one combustion chamber for subsequent combustion.

DETAILED DESCRIPTION

Figure 1:
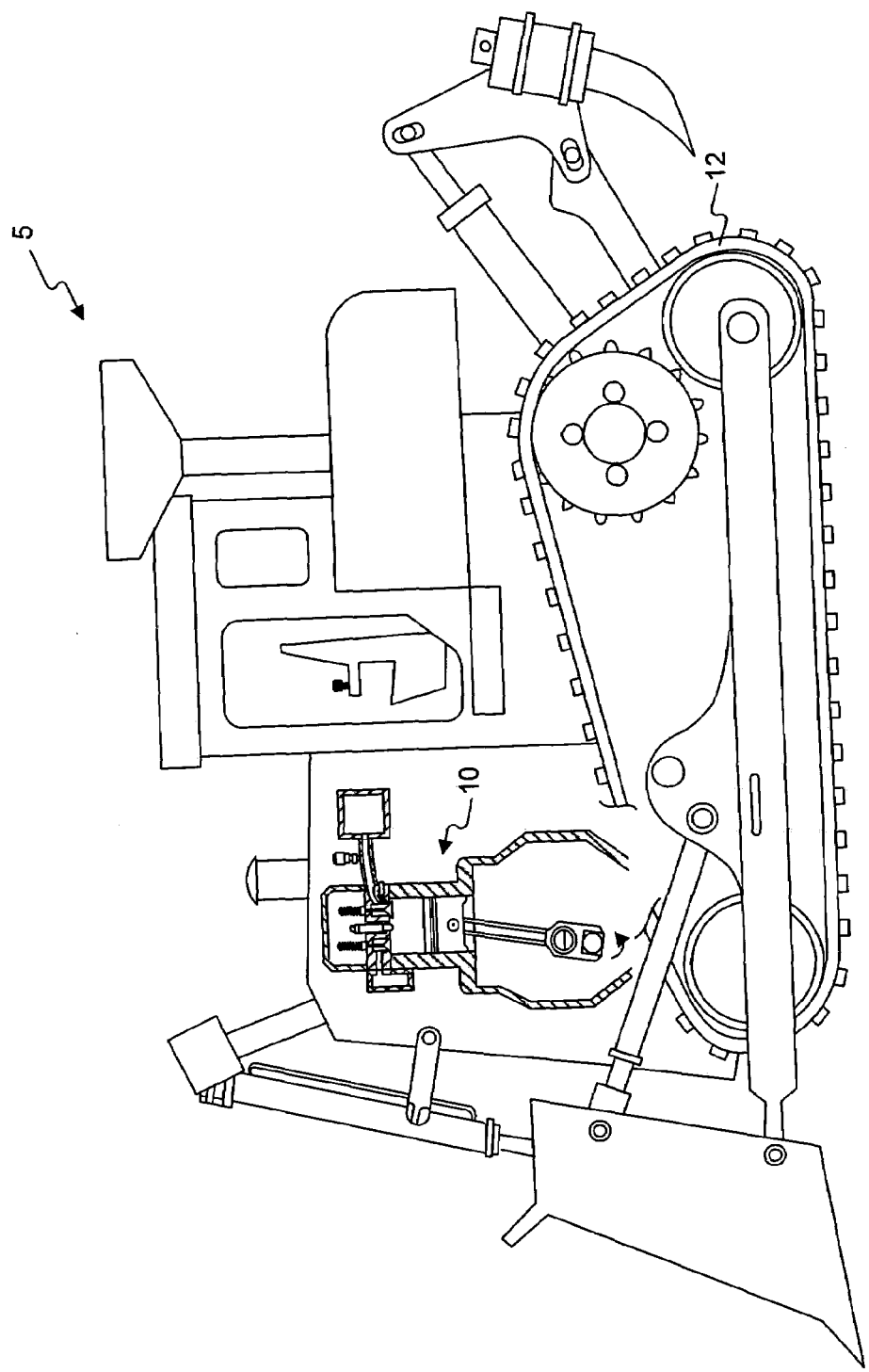
FIG. 1 is a diagrammatic illustration of an exemplary disclosed work machine.

FIG. 1 illustrates a work machine 5 having an exemplary internal combustion engine 10. Work machine 5 may be a fixed machine, or a mobile machine having a traction device 12. Work machine 5 may perform some type of operation associated with an industry such as mining, construction, farming, transportation, or any other industry known in the art. For example, work machine 5 may be an earth moving machine such as a dozer, a loader, a backhoe, an excavator, a motor grader, a dump truck, or any other earth moving machine. Work machine 5 may alternatively include a generator set, a pump, a passenger vehicle, a marine vessel, or any other suitable operation-performing work machine.

Figure 2:
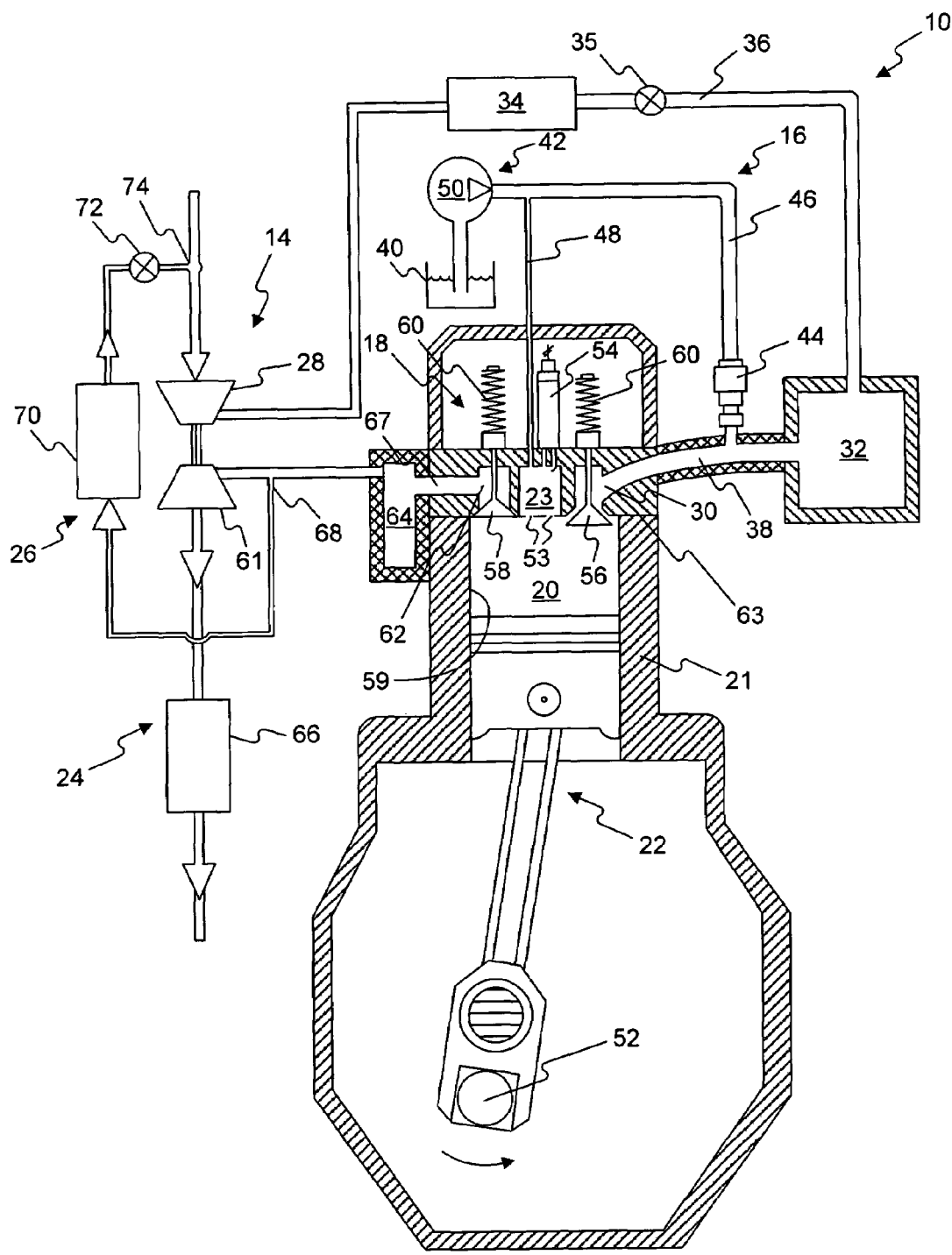
FIG. 2 is a diagrammatic illustration of an exemplary disclosed internal combustion engine for the work machine of FIG. 1.

Engine 10 may be configured to compress a mixture of fuel and air, which is then controllably spark-ignited to produce a power output and exhaust. As illustrated in FIG. 2, engine 10 may include an air induction system 14, a fuel system 16, a valve actuation system 18, a plurality of combustion chambers 20 (only one shown), a piston assembly 22 disposed within each combustion chamber 20, a pre-combustion chamber 23 associated with each combustion chamber 20, an exhaust system 24, and an exhaust gas recirculation (EGR) system 26.

Air induction system 14 may include a means for introducing charged air into combustion chambers 20 of engine 10. For example, air induction system 14 may include a compressor 28 in fluid communication with one or more inlet ports 30 via an intake manifold 32. Air induction system 14 may also include an air cooler 34 configured to cool compressed air from compressors 28 before the air enters intake manifold 32, and a throttle valve 35 configured to regulate the flow of air into engine 10. It is contemplated that compressor 28 may be absent, if a naturally-aspirated engine is desired. It is further contemplated that additional and/or different components may be included within air induction system 14 such as, for example, an air cleaner, a wastegate, a bypass system, a control system, and other means known in the art for introducing charged air into combustion chambers 20.

Compressor 28 may be fluidly connected to intake manifold 32 via a fluid conduit 36 and configured to compress the air flowing into engine 10 to a predetermined pressure level. Compressor 28 may embody a fixed geometry compressor, a variable geometry compressor, or any other type of compressor known in the art. It is contemplated that multiple compressors 28 may alternatively be included within air induction system 14 and disposed in a series or parallel relationship.

Inlet port 30 may be connected to intake manifold 32 via a fluid passageway 38 and configured to fluidly communicate the compressed air from intake manifold 32 with valve actuation system 18 associated with each combustion chamber 20. It is contemplated that multiple inlet ports 30 may be associated with each combustion chamber 20.

Intake manifold 32 may be configured to distribute air to each of combustion chambers 20 and may include an inlet and an outlet. It is contemplated that multiple intake manifolds 32 may be included within engine 10, each intake manifold 32 distributing air from a single common inlet to separate banks of combustion chambers 20.

Air cooler 34 may facilitate the transfer of heat to or from the air compressed by compressors 28, prior to the compressed air entering intake manifold 32. For example, air cooler 34 may embody an air-to-air heat exchanger or a liquid-to-air heat exchanger. Air cooler 34 may include a tube and shell type heat exchanger, a plate type heat exchanger, or any other type of heat exchanger known in the art.

Throttle valve 35 may be located within fluid conduit 36 and between compressor 28 and engine 10 to control the amount of air delivered to combustion chambers 20. Throttle valve 35 may be positioned at any suitable location within fluid conduit 36 such as, for example, before or after air cooler 34. Throttle valve 35 may include a valve element movable from a flow-passing position against a spring bias toward a flow-restricting position. When in the flow-passing position, atmospheric air may be directed into engine 10 substantially unrestricted. The term restricted, for the purposes of this disclosure, is to be interpreted as at least partially blocked from fluid flow. It is also contemplated that the valve element of throttle valve 35, when in the flow-restricting position, may be fully blocked from fluid flow. Throttle valve 35 may include a butterfly valve element, a spool valve element, a shutter valve element, a check valve element, a diaphragm valve element, a gate valve element, a shuttle valve element, a ball valve element, a globe valve element, or any other type of valve element known in the art.

Fuel system 16 may include components that cooperate to supply fuel to combustion and pre-combustion chambers 20, 23 of engine 10. Specifically, fuel system 16 may include a tank 40 configured to hold a supply of fuel, a fuel pumping arrangement 42 configured to pressurize the fuel and direct the pressurized fuel to a plurality of fuel injectors 44 by way of a manifold 46, and to each pre-combustion chamber 23 by way of a fuel line 48.

Fuel pumping arrangement 42 may include one or more pumping devices that function to increase the pressure of the fuel and direct one or more pressurized streams of fuel to manifold 46. In one example, fuel pumping arrangement 42 includes a low pressure source 50. Low pressure source 50 may embody a transfer pump configured to provide low pressure feed to manifold 46. A check valve (not shown) may be disposed between low pressure source 50 and manifold 46 to provide for one-directional flow of fuel from fuel pumping arrangement 42 to manifold 46. It is contemplated that fuel pumping arrangement 42 may include additional and/or different components than those listed above such as, for example, a high pressure source disposed in series with low pressure source 50.

Low pressure source 50 may be operably connected to engine 10 and driven by crankshaft 52. Low pressure source 50 may be connected with crankshaft 52 in any manner readily apparent to one skilled in the art where a rotation of crankshaft 52 will result in a corresponding rotation of a pump drive shaft (not shown). For example, a pump drive-shaft of low pressure source 50 may be connected to crankshaft 52 through a gear train (not shown), or may alternatively be driven electrically, hydraulically, pneumatically, or in any other appropriate manner.

Each fuel injector 44 may be operable to inject a predetermined amount of fuel at predetermined timings and fuel pressures. The timing of fuel injection may be synchronized with the motion of piston assembly 22. For example, fuel may be injected as piston assembly 22 nears a top-dead-center position in a compression stroke, as piston assembly 22 begins the compression stroke heading towards a top-dead-center position, or as piston assembly 22 is moving from a top-dead-center position towards a bottom-dead-center position during an expansion stroke. In order to accomplish these specific injection events, engine 10 may request a specific quantity of fuel be injected at a specific start of injection (SOI) timing, a specific SOI pressure, and/or a specific end of injection (EOI) pressure.

The amount of fuel injected into fluid passageway 38 by fuel injector 44 may at least partially control the ratio of fuel to air introduced into combustion chamber 20. Specifically, if it is desired to introduce a lean mixture of fuel and air (mixture having a relatively low amount of fuel compared to the amount of air) into combustion chamber 20, fuel injector 44 may inject fuel for a shorter period of time than if a rich mixture of fuel and air (mixture having a relatively large amount of fuel compared to the amount of air) is desired. Likewise, if a rich mixture of fuel and air is desired, fuel injector 44 may inject fuel for a longer period of time than if a lean mixture is desired. It is contemplated that fuel injector 44 may be omitted, if desired, and an alternate type of fuel valve included, if desired.

Valve actuation system 18 may be configured to meter a fuel and air mixture into and allow exhaust out of combustion chamber 20 and may include at least one intake valve 56, at least one exhaust valve 58, and a return spring 60 associated with each of intake and exhaust valves 56, 58. Additional components may be included within valve actuation system 18 such as, for example, a valve actuator (not shown), additional intake and exhaust valves 56, 58 associated with each combustion chamber 20, a bridge member interconnecting multiple intake valves 56 or exhaust valves 58, and other components known in the art. The valve actuator may embody any means for actuating intake valve 56 or exhaust valve 58 such as, for example, a cam/push-rod/rocker arm assembly, a solenoid actuator, a hydraulic actuator, or any other means for actuating known in the art.

Intake valve 56 may selectively fluidly communicate inlet port 30 with combustion chamber 20. Specifically, intake valve 56 may be movable between a first position at which the fuel and air mixture flows into combustion chamber 20, and a second position at which intake valve 56 engages a seat to block the fuel and air mixture from combustion chamber 20.

Exhaust valve 58 may selectively fluidly communicate exhaust system 24 with combustion chamber 20 to selectively allow exhaust to flow from combustion chamber 20 into exhaust system 24. In particular, exhaust valve 58 may be movable between a first position at which the exhaust flows out of combustion chamber 20 and a second position at which exhaust valve 58 engages a seat to block exhaust from exiting combustion chamber 20.

Each combustion chamber 20 may be configured to receive the fuel and air mixture from fuel and air induction systems 16, 14, to house the combustion process, and to direct exhaust resulting from the combustion process to exhaust system 24. Combustion chamber 20 may be at least partially defined by a cylinder bore 59 formed within engine block 21, a cylinder head 63 connected to engine block 21, and piston assembly 22. It is contemplated that additional elements may cooperate to further define combustion chamber 20 such as, for example, a cooling chamber (not shown) disposed between cylinder bore 59 and engine block 21, a cylinder liner (not shown) disposed within cylinder bore 59, a means (not shown) for sealing cylinder head 63 to engine block 21, and other combustion chamber components known in the art.

Piston assembly 22 may be slidably disposed with each combustion chamber 20 of engine 10 and configured to reciprocate between a bottom-dead-center (BDC) position, or lower-most position within combustion chamber 20, and a top-dead-center (TDC) position, or upper-most position within combustion chamber 20. In particular, piston assembly 22 may include a piston and a connecting rod that connects piston assembly 22 to crankshaft 52 of engine 10. As crankshaft 52 rotates 180 degrees, piston assembly 22 may move through one full stroke between BDC and TDC. Engine 10 may be a four stroke engine, wherein a complete cycle includes an intake stroke (TDC to BDC), a compression stroke (BDC to TDC), a power stroke (TDC to BDC), and an exhaust stroke (BDC to TDC).

Pre-combustion chamber 23 may include one or more orifices 53 in fluid communication with combustion chamber 20, and a bore configured to receive a spark plug 54. Pre-combustion chamber 23 may be exposed to the same mixture of fuel and air that is present in combustion chamber 20 via orifices 53. It is contemplated that any number of orifices 53 may be included within pre-combustion chamber 23.

Pre-combustion chamber 23 may facilitate operation of engine 10 during lean burn conditions. Specifically, during a lean burn condition, the fuel/air mixture within combustion chamber 20 may be too lean to reliably spark ignite. To initiate combustion of this lean fuel/air mixture, fuel from low pressure source 50 may be directed into pre-combustion chamber 23 via fuel line 48 to create a locally rich atmosphere readily ignitable via spark plug 54. A spark developed across electrodes of spark plug 54 may ignite the locally rich atmosphere creating a flame, which may be jetted or otherwise advanced out of pre-combustion chamber 23 via orifices 53 into combustion chamber 20. The flame jet may ignite the lean fuel/air mixture within combustion chamber 20 at the desired SOI timing to drive piston assembly 22 downward, thereby generating mechanical output. In this manner, a lean, normally noncombustible fuel/air mixture may be reliably combusted. It is contemplated that a dedicated valve or injector element may be disposed within fuel line 48 and associated with pre-combustion chamber 23 to regulate the introduction of fuel into pre-combustion chamber 23.

Pre-combustion chamber 23 may facilitate operation of engine 10 during lean burn conditions without enriching the fuel/air mixture. Specifically, although the fuel/air mixture within combustion chamber 20 may be too lean to ignite desirably, the fuel/air mixture may still ignite. As this lean fuel/air mixture within pre-combustion chamber 23 does ignite, flame jets may be created that advanced out of pre-combustion chamber 23 via orifices 53 into combustion chamber 20 to ignite the lean fuel/air mixture within combustion chamber 20 in a desirable manner. In this manner, pre-combustion chamber 23 may enable a lean bum condition, even without fuel enriching.

Exhaust system 24 may be configured to direct exhaust from combustion chamber 20 to a turbine 61 via an exhaust port 62 and an exhaust manifold 64. After exiting turbine 61, the exhaust may be directed through a catalyzed member 66 to the atmosphere. It is contemplated that exhaust system 24 may include additional and/or different components than those recited above such as, for example, a particulate filter, or any other exhaust system component known in the art.

Turbine 61 may be connected to drive compressor 28. In particular, as the hot exhaust gases exiting engine 10 expand against blades (not shown) of turbine 61, turbine 61 may rotate and drive compressor 28. It is contemplated that more than one turbine 61 may alternatively be included within exhaust system 24 and disposed in a parallel or series relationship, if desired. It is also contemplated that turbine 61 may be omitted and compressor 28 driven by engine 10 mechanically, hydraulically, electrically, or in any other manner known in the art, if desired.

Exhaust port 62 may be connected to intake manifold 64 via a fluid passageway 67 and configured to fluidly communicate exhaust from combustion chambers 20 with exhaust manifold 64. It is contemplated that multiple exhaust ports 62 may be associated with each combustion chamber 20.

Exhaust manifold 64 may be configured to collect exhaust from each of combustion chambers 20 and to direct the exhaust to turbine 61. Exhaust manifold 64 may include an inlet and an outlet. It is contemplated that multiple exhaust manifolds 64 may be included within engine 10, each exhaust manifold 64 collecting exhaust from separate banks of combustion chambers 20 and directing the exhaust from engine 10 via a single common outlet.

Catalyzed member 66 may include a structure coated with or otherwise containing a catalyst to reduce the by-products of combustion. In one example, the structure may be coated with a 3-way catalyst that supports the reduction of hydrocarbons (HC), carbon dioxide (CO), and particulate matter. The catalyst may include, for example, a base metal oxide, a molten salt, or a precious metal that catalytically reacts with HC, CO, and particulate matter. It is contemplated that the catalyzed member 66 may be omitted, if desired.

EGR system 26 may include a means for redirecting a portion of the exhaust flow of engine 10 from exhaust system 24 into air induction system 14. For example, EGR system 26 may include an inlet port 68, an exhaust cooler 70, a recirculation valve 72, and a discharge port 74. It is contemplated that EGR system 26 may include additional and/or different components such as a catalyst, an electrostatic precipitation device, a shield gas system, a particulate trap, and other means known in the art for redirecting exhaust from exhaust system 24 into air induction system 14.

Inlet port 68 may be connected to exhaust system 24 and configured to receive at least a portion of the exhaust flow from engine 10. Specifically, inlet port 68 may be disposed upstream of turbine 61 to receive high pressure exhaust gas directly from exhaust manifold 64. It is contemplated that inlet port 68 may alternatively be located downstream of turbine 61 to receive low pressure exhaust from turbine 61.

Exhaust cooler 70 may be fluidly connected to inlet port 68 and configured to cool the portion of the exhaust flowing through inlet port 68. Exhaust cooler 70 may include a liquid-to-air heat exchanger, an air-to-air heat exchanger, or any other type of heat exchanger known in the art for cooling an exhaust flow. It is contemplated that exhaust cooler 70 may be omitted, if desired.

Recirculation valve 72 may be fluidly connected to exhaust cooler 70 and configured to regulate the flow of exhaust through EGR system 26. Recirculation valve 72 may include a butterfly valve element, a spool valve element, a shutter valve element, a check valve element, a diaphragm valve element, a gate valve element, a shuttle valve element, a ball valve element, a globe valve element, or any other valve element known in the art. The valve element of recirculation valve 72 may be movable between a flow passing position and a flow restricting position. The position of the valve element of recirculation valve 72 between the flow passing and flow restricting positions may, at least in part, affect the amount of exhaust gas recirculated back into engine 10.

Discharge port 74 may be fluidly connected to recirculation valve 72 and configured to direct the exhaust flow regulated by recirculation valve 72 into air induction system 14. Specifically, discharge port 74 may be connected to air induction system 14 upstream of compressor 28, such that compressor 28 may draw the exhaust flow from exhaust gas recirculation system 26 via discharge port 74.

INDUSTRIAL APPLICABILITY

The disclosed EGR system may be applicable to any gasoline-fueled, spark-ignited engine where emission control is desired. The disclosed EGR system may reduce the amount of NOx and particulate matter exhausted to the atmosphere by recirculating an amount of exhaust back into combustion chambers of the engine to such a degree that a lean burn condition is created. The lean burn condition may be accommodated via the use of a pre-combustion chamber. The operation of EGR system 26 and engine 10 will now be explained.

Atmospheric air may be drawn into air induction system 14 via compressor 28 where it may be pressurized to a predetermined level before entering combustion chamber 20 of engine 10. Fuel may be mixed with the pressurized air before or after entering combustion chamber 20 and combusted by engine 10 to produce mechanical work output and an exhaust flow containing gaseous compounds and solid particulate matter. Substantially immediately after exiting engine 10, the exhaust gas flow may be divided into two flows, including a first flow redirected to air induction system 14 and a second flow directed through turbine 61 to catalyzed member 66 to the atmosphere. It is also contemplated that the two flows of exhaust gas may be divided downstream of turbine 61, if desired.

As the first exhaust flow moves through inlet port 68 of EGR system 26, it may be directed to exhaust cooler 70. The first exhaust flow may be cooled by exhaust cooler 70 to a predetermined temperature and then drawn through recirculation valve 72 and discharge port 74 back into air induction system 14 by compressor 28. The recirculated exhaust flow may then be mixed with the air entering combustion chambers 20 for subsequent combustion.

The exhaust gas, which is directed to combustion chambers 20, may reduce the concentration of oxygen therein, which in turn lowers the maximum combustion temperature within engine 10. The lowered maximum combustion temperature may slow the chemical reaction of the combustion process, thereby decreasing the formation of nitrous oxides and reducing the likelihood of knock (e.g., auto-ignition of fuel at an undesired timing during compression in the cylinder).

As the second flow of exhaust enters turbine 61, the expansion of hot exhaust gases may cause turbine 61 to rotate, thereby rotating connected compressor 28 to compress the inlet air. After exiting turbine 61, the second flow of exhaust may be directed through catalyzed member 66 to further reduce the amount of HC, CO, and/or particulate matter exhausted to the atmosphere.

Because engine 10 may utilize pre-combustion chamber 23, the amount of exhaust recirculated through engine 10 may be increased. As described above, when the amount of exhaust recirculated through engine 10 increases, the air-to-fuel ratio of the mixture directed to combustion chamber 20 also increases. At some point, this increased air-to-fuel ratio may reach a lean burn threshold, at which normal spark ignition may be hindered. In this situation, fuel may be directed via fluid line 48 to pre-combustion chamber 23 to create an atmosphere locally rich in fuel. The locally rich atmosphere can then be spark ignited, thereby producing a flame that may propagate into combustion chamber 20 via orifices 53 to raise the temperature and pressure of the lean mixture within combustion chamber 20 above the ignition threshold of the lean mixture. In this manner, the amount of exhaust gas recirculated through engine 10 (up to about 35% of the total air/exhaust intake) may be greater than the amount recirculated through an engine without a pre-combustion chamber (less than about 25% of the total air/exhaust intake), while providing for consistent predictable operation of engine 10.

Because the amount of exhaust gas capable of being recirculated through engine 10 has increased, the emission of solid particulate matter and the production of nitrous oxides may be reduced. In particular, the greater amount of exhaust recirculated through engine 10 may allow for a greater amount of solid particulate matter to be combusted during subsequent combustion events. Further, the lean burn condition created by the increased amount of exhaust reduces the temperature of the combustion process more than a non-lean burn recirculation event, resulting in a lower production of nitrous oxides.

In addition, the increased amount of exhaust gas may further reduce engine knock. In particular, the reduced the temperature of the combustion process and the slowed combustion reaction may lower the likelihood of engine knock.

It will be apparent to those skilled in the art that various modifications and variations can be made to the disclosed EGR system. Other embodiments will be apparent to those skilled in the art from consideration of the specification and practice of the disclosed EGR system. It is intended that the specification and examples be considered as exemplary only, with a true scope being indicated by the following claims and their equivalents.

What is claimed is:

1. An internal combustion engine, comprising:
   at least one combustion chamber;
   a piston slidably disposed within the at least one combustion chamber and configured to reciprocate between a top-dead-center position and a bottom-dead-center position;
   a pre-combustion chamber in communication with the at least one combustion chamber;
   an air induction system configured to direct air into the at least one combustion chamber;
   a fuel system configured to direct gasoline into the at least one combustion chamber;
   a spark plug at least partially disposed within the pre-combustion chamber and configured to selectively ignite a mixture of the air and gasoline;
   an exhaust system configured to direct exhaust gas from the at least one combustion chamber, the exhaust gas divided into two streams, a first stream directed upstream of a turbine and away from an exhaust gas recirculation system; and
   a second stream directed to the exhaust gas recirculation system configured to selectively redirect at least a portion of the exhaust gas from the exhaust system back to the air induction system.

2. The internal combustion engine of claim 1, further including a catalyzed member disposed within the exhaust system.

3. The internal combustion engine of claim 2, wherein the catalyzed member includes a 3-way catalyst.

4. The internal combustion engine of claim 1, wherein the exhaust gas recirculation system includes an exhaust cooler.

5. The internal combustion engine of claim 1, wherein the exhaust gas recirculation system is configured to direct an amount of exhaust gas sufficient to create a lean operating condition of the internal combustion engine.

6. The internal combustion engine of claim 5, wherein the amount of exhaust gas redirected is up to about 35% of the sum of the air and the exhaust gas directed into the at least one combustion chamber.

7. A method of operating an internal combustion engine, comprising:
   directing a mixture of gasoline and air to at least one combustion chamber;
   directing a mixture of gasoline and air to a pre-combustion chamber in fluid communication with the at least one combustion chamber;
   compressing the gasoline/air mixture in the at least one combustion chamber and the pre-combustion chamber;
   igniting the compressed gasoline/air mixture to produce a power output and exhaust gas;
   directing the entire exhaust gas upstream of a turbine;
   dividing the exhaust gas into two streams; and
   redirecting one stream of exhaust gas back into the at least one combustion chamber for subsequent combustion.

8. The method of claim 7, wherein igniting includes spark igniting the compressed gasoline/air mixture.

9. The method of claim 7, further including directing a portion of the exhaust gas through a catalyzed member.

10. The method of claim 9, wherein the catalyzed member is coated with a 3-way catalyst.

11. The method of claim 7, further including cooling the redirected stream of exhaust gas before the redirected stream of exhaust gas reaches the at least one combustion chamber.

12. The method of claim 7, wherein redirecting includes redirecting an amount of exhaust gas sufficient to create a lean operating condition of the internal combustion engine.

13. The method of claim 12, wherein the amount of exhaust gas redirected is up to about 35% of the sum of the air and the exhaust gas directed into the at least one combustion chamber.

14. A work machine comprising:
    a traction device; and
    an internal combustion engine configured to drive the traction device, the internal combustion engine including:
      at least one combustion chamber;
      a piston slidably disposed within the at least one combustion chamber and configured to reciprocate between a top-dead-center position and a bottom-dead-center position;
      a pre-combustion chamber in communication with the at least one combustion chamber;
      an air induction system configured to direct air into the at least one combustion chamber;
      a fuel system configured to selectively direct a flow of gasoline into the at least one combustion chamber
      a spark plug at least partially disposed within the pre-combustion chamber and configured to selectively ignite a mixture of the air and gasoline;
      an exhaust system configured to direct exhaust gas from the at least one combustion chamber, the exhaust gas divided into two streams, the first stream directed to an upstream of a turbine and away from an exhaust gas recirculation system; and
    the second stream directed to the exhaust gas recirculation system configured to selectively redirect at least a portion of the exhaust gas from the exhaust system back to the air induction system.

15. The work machine of claim 14, further including a catalyzed member disposed within the exhaust system.

16. The work machine of claim 15, wherein the catalyzed member includes a 3-way catalyst.

17. The work machine of claim 14, wherein the exhaust gas recirculation system is configured to direct an amount of exhaust gas sufficient to create a lean operating condition of the internal combustion engine.

18. The work machine of claim 17, wherein the amount of exhaust gas redirected is up to about 35% of the sum of the air and the exhaust gas directed into the at least one combustion chamber.

* * * * *

UNITED STATES PATENT AND TRADEMARK OFFICE
CERTIFICATE OF CORRECTION

| | | |
|---|---|---|
| PATENT NO. | : 7,261,097 B2 | Page 1 of 1 |
| APPLICATION NO. | : 11/169674 | |
| DATED | : August 28, 2007 | |
| INVENTOR(S) | : Gong et al. | |

It is certified that error appears in the above-identified patent and that said Letters Patent is hereby corrected as shown below:

In Column 5, Line 57, delete "bum" and insert -- burn --, therefor.

In Column 6, Line 20, delete "bum" and insert -- burn --, therefor.

Signed and Sealed this

First Day of July, 2008

JON W. DUDAS
*Director of the United States Patent and Trademark Office*